United States Patent
Coleman et al.

(10) Patent No.: US 10,921,180 B2
(45) Date of Patent: Feb. 16, 2021

(54) METHODS AND APPARATUS FOR IMPROVED SENSOR VIBRATION CANCELLATION

(71) Applicant: Raytheon BBN Technologies Corp., Cambridge, MA (US)

(72) Inventors: Ronald Bruce Coleman, Arlington, MA (US); Richard James Mullen, Needham, MA (US); Jeffrey Mazurek, Harvard, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 128 days.

(21) Appl. No.: 14/885,289

(22) Filed: Oct. 16, 2015

(65) Prior Publication Data

US 2017/0108374 A1    Apr. 20, 2017

(51) Int. Cl.
  *G01J 1/42*    (2006.01)
  *G01J 1/02*    (2006.01)
  *G01S 5/16*    (2006.01)

(52) U.S. Cl.
  CPC .............. *G01J 1/0295* (2013.01); *G01J 1/42* (2013.01); *G01S 5/16* (2013.01)

(58) Field of Classification Search
  CPC . H04N 5/33; G01J 5/522; A61B 6/583; G01T 1/40; G01D 18/00
  See application file for complete search history.

(56) References Cited

U.S. PATENT DOCUMENTS

| | | | |
|---|---|---|---|
| 5,157,596 A | 10/1992 | Alcone | |
| 6,275,591 B1 | 8/2001 | Hsueh et al. | |
| 2006/0021498 A1* | 2/2006 | Moroz | F41G 3/147 89/41.06 |
| 2006/0158329 A1* | 7/2006 | Burkley | H04W 76/007 340/539.13 |
| 2008/0025728 A1 | 1/2008 | Shpantzer et al. | |
| 2010/0097221 A1* | 4/2010 | Kreiner | G01S 13/82 340/572.1 |

OTHER PUBLICATIONS

Han et al "Development of real-time motion artifact reduction algorithm for wearable photoplethysmography", Conference of the IEEE EMBS, Aug. 23-26, 2007, p. 1538-1541.*
Tamura et al. "Wearable Photoplethysmographic Sensors—Past and Present" Electronics, Apr. 23, 2014, p. 282-302.*
International Search Report and Written Opinion for application No. PCT/US2016/057018 dated Jan. 25, 2017.

* cited by examiner

*Primary Examiner* — David P Porta
*Assistant Examiner* — Mamadou Faye
(74) *Attorney, Agent, or Firm* — Lando & Anastasi, LLP

(57) ABSTRACT

Infrared sensing systems having improved vibration cancelation, and methods of achieving improved vibration cancelation. In one example, an infrared sensing system includes an infrared sensor configured to produce a sensor output signal representative of a response of the infrared sensor to infrared excitation and vibration excitation, an accelerometer configured to provide an acceleration signal responsive to the vibration excitation, and a controller, including an adaptive digital filter, coupled to the infrared sensor and to the accelerometer, and configured to receive the acceleration signal and to adjust coefficients of the adaptive digital filter so as to minimize coherence between a residual signal and the acceleration signal, the residual signal being a difference between the sensor output signal and a filter output signal from the adaptive digital filter.

12 Claims, 15 Drawing Sheets

METHODS AND APPARATUS FOR IMPROVED SENSOR VIBRATION CANCELLATION

BACKGROUND

Infrared (IR) sensors used in counter-shooter and a variety of other applications are typically mounted to moving platforms (e.g., vehicles, helicopters, etc.). The operation of these vehicles produces local vibrations at the IR sensor mounting locations. These vibrations add noise to the IR sensor response signal, which can severely degrade the ability to detect signals of interest, such as the IR flash from a weapon discharge event, for example.

SUMMARY OF INVENTION

Aspects and embodiments are directed to methods and apparatus for minimizing the vibration response of sensors, such as infrared (IR) sensors, for example, as would typically be experienced when the sensor is mounted to a vibrating structure (such as a moving vehicle). As discussed in more detail below, aspects and embodiments provide an approach to minimize the effects of local acceleration/vibration on the response of an IR sensor, and thereby improve performance in detecting IR signatures from short-duration events, such as gunshots, for example.

According to one embodiment an IR sensing system comprises an IR sensor configured to produce a sensor output signal representative of a response of the IR sensor to an IR signature of interest and vibration excitation, a reference sensor configured to provide a reference signal responsive to the vibration excitation, and a controller, including an adaptive digital filter, coupled to the IR sensor and to the reference sensor, and configured to receive the reference signal and to adjust coefficients of the adaptive digital filter so as to minimize coherence between a residual signal and the reference signal, the residual signal being a difference between the sensor output signal and a filter output signal from the adaptive digital filter.

In one example the reference sensor is an accelerometer and the reference signal is an acceleration signal. The IR sensor and the accelerometer are disposed proximate one another on a movable platform. In one example the accelerometer is coupled to a housing of the IR sensor. The controller can be configured to implement a least-mean-square algorithm to minimize a portion of the sensor output signal that is correlated with the acceleration signal, thereby minimizing the coherence. In one example the controller is further configured to receive the residual signal.

In another example the controller is configured to receive the residual signal and to implement a least-mean-square algorithm to minimize a portion of the sensor output signal that is correlated with the reference signal, thereby minimizing the coherence.

According to another embodiment an IR sensing system comprises an IR sensor configured to produce a sensor output signal representative of a response of the IR sensor to an IR event and vibration excitation, at least one accelerometer configured to provide an acceleration signal responsive to the vibration excitation, and a controller, including an adaptive digital filter, coupled to the IR sensor and to the at least one accelerometer, and configured to receive the acceleration signal and to adjust coefficients of the adaptive digital filter so as to minimize coherence between a residual signal and the acceleration signal, the residual signal being a difference between the sensor output signal and a filter output signal from the adaptive digital filter.

In one example the controller is configured to implement a least-mean-square algorithm to minimize a portion of the sensor output signal that is correlated with the acceleration signal, thereby minimizing the coherence. The controller can be further configured to receive the residual signal. In one example the at least one accelerometer is coupled to a housing of the IR sensor.

Another embodiment is directed to a method of providing vibration cancelation in an infrared (IR) sensing system, the method comprising receiving a sensor output signal from an IR sensor, the sensor output signal being representative of a response of the IR sensor to an IR signature of interest and vibration excitation, receiving at an input to an adaptive digital filter a reference signal from a reference sensor, the reference signal being responsive to the vibration excitation, producing a residual signal by taking a difference between the sensor output signal and a filter output signal from the adaptive digital filter, and adjusting coefficients of the adaptive digital filter so as to minimize coherence between the residual signal and the reference signal.

In one example the reference sensor is an accelerometer and the reference signal is an acceleration signal. In one example the act of adjusting the coefficients includes applying a least-mean-square algorithm to minimize a portion of the sensor output signal that is correlated with the acceleration signal, thereby minimizing the coherence between the residual signal and the acceleration signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
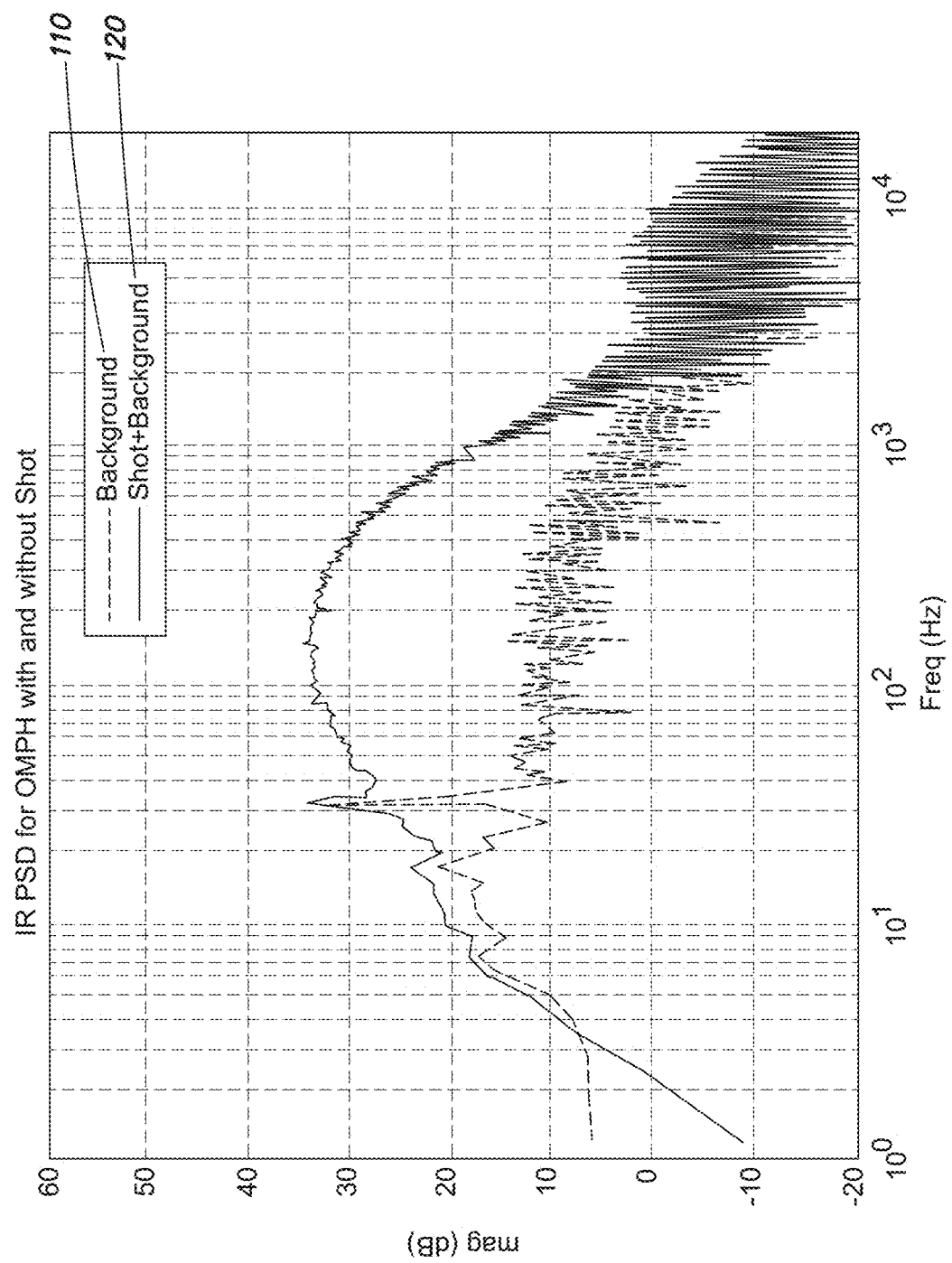
FIG. 1A is a graph illustrating measured examples of an infrared sensor power spectral density signal as a function of frequency without movement of the sensor platform.

Aspects and embodiments are directed to systems and methods for minimizing the vibration response of infrared (IR) sensors as would be experienced when the sensor is mounted to a vibrating structure, such as a moving vehicle, for example. According to various aspects, there is provided an approach by which to minimize effects of platform self-noise (i.e., from vibration) on the IR sensor output response, and thereby improve performance in detecting IR signatures from events or objects. For example, the noise on the IR sensor output response signal that is caused by vehicle vibration overlaps the frequency range of certain IR signature of interest, such as the IR flash response caused by a weapon discharge, for example. As discussed in more detail below, according to certain embodiments, in order to improve detection of the events of interest, such as a gunshot flash response, adaptive processing is used to minimize the response in the IR sensor signal that is correlated with the local vibration, which can be characterized by an accelerometer placed near the IR sensor, while preserving and improving the desired IR sensing function.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

IR sensors used in a variety of applications, including counter-shooter applications in which the sensor is used to detect an IR muzzle flash, are typically mounted to moving platforms, such as vehicles, helicopters, and the like. As a result, the response of these IR sensors is comprised of both the signal of interest (e.g., the IR flash resulting from a weapon discharge) and various noise contributors, including noise from the changing background due to the vehicle's forward motion, noise correlated with local vibrations, and other noise. In general, at least some of the noise from these various contributors will overlap the frequency range spanned by the IR signal of interest. Accordingly, minimizing the noise floor so as to improve the signal-to-noise ratio (SNR) in the frequency band of interest is desirable to improve the detection capability and accuracy of the IR sensor system.

FIG. 1A illustrates a graph of the IR sensor power spectral density (PSD) as a function of frequency for the case in which there is no movement of the sensor platform. The vertical (y) axis represents the magnitude of the PSD, and the signal frequency is plotted along the horizontal (x) axis. Trace 110 represents the measured background noise for a stationary sensor platform. Trace 120 represents the measured data of the IR sensor response to an M4 weapon discharge, and therefore includes both the signal of interest and the stationary-case background noise. As shown, in this situation, the IR sensor signal energy (trace 120) exceeds the background level (trace 110) by approximately 10-25 dB within the frequency range of 50 Hz to 1000 Hz. Thus, in the absence of other noise sources, detection algorithms can be applied to detect the weapon discharge (flash signal) for use in applications such as, for example, localizing the shooter location or identifying the weapon type.

Figure 1B:
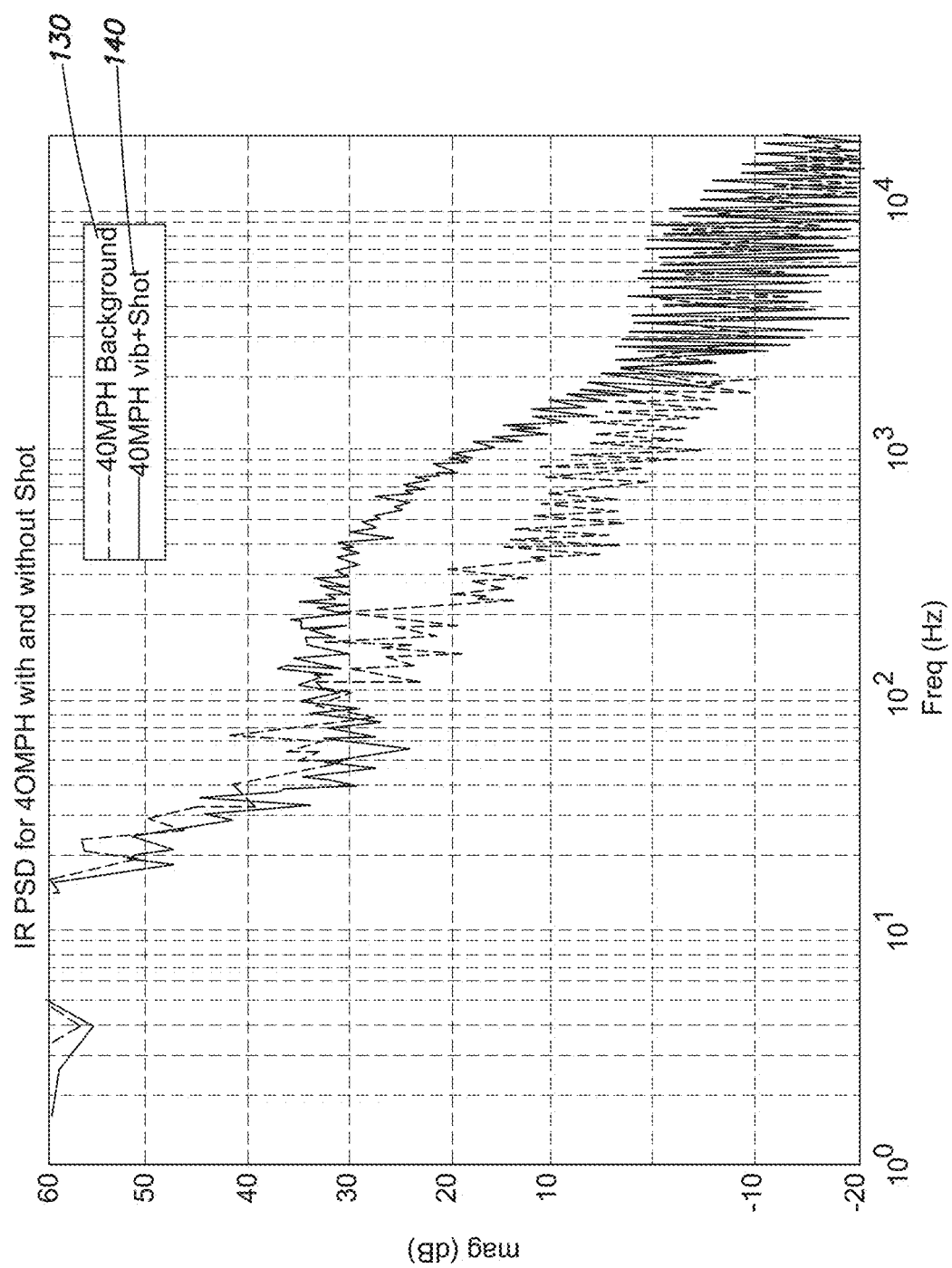
FIG. 1B is a graph illustrating further measured examples of an infrared sensor power spectral density signal as a function of frequency with movement of the sensor platform.

When the IR sensor is mounted to a moving vehicle, the motion of the vehicle changes the "field-of-view" of the IR sensor over time, adding additional background noise, and reducing the SNR of the signal of interest. This is shown in FIG. 1B. Referring to FIG. 1B, trace 130 represents the measured background noise for the sensor platform moving at a constant forward velocity of 40 miles-per-hour. Trace 140 represents the measured data of the IR sensor response to the M4 weapon discharge in the case of the moving sensor platform. As shown, the forward motion of the platform raises the background noise significantly in the frequency range below 300 Hz, making detection improbable using frequencies below ~100 Hz. As discussed above, a portion of the motion-induced noise is due to the steady forward motion of the platform, which changes the sensor's field of view. For example, buildings, water, trees, etc., will produce a low-frequency content to this noise related to the speed of the platform and the size of the object within the field-of-view of the sensor. This background noise must either be simply contended with in the detection process, or compensated for using techniques unrelated to the approach disclosed herein. However, another portion of the motion-induced noise is related to local vibration of the IR sensor, which also contributes to the overall noise floor and further decreases the SNR for detecting the signal of interest. Aspects and embodiments are directed to using adaptive processing to remove this vibration-related noise component from the IR signal to improve detection on moving platforms. In particular, as discussed further below, according to one embodiment, this noise component can be suppressed (i.e. minimized) in the IR sensor response by using another sensor (e.g., an accelerometer) to measure the local vibration and applying adaptive signal processing to remove the portion of the IR sensor response that is correlated with the local vibration. As a result, the signal of interest (e.g., flash from a gunshot) can be detected with higher signal-to-noise, supporting increased detection ranges, bearing accuracy to shooter, etc.

Figure 2:
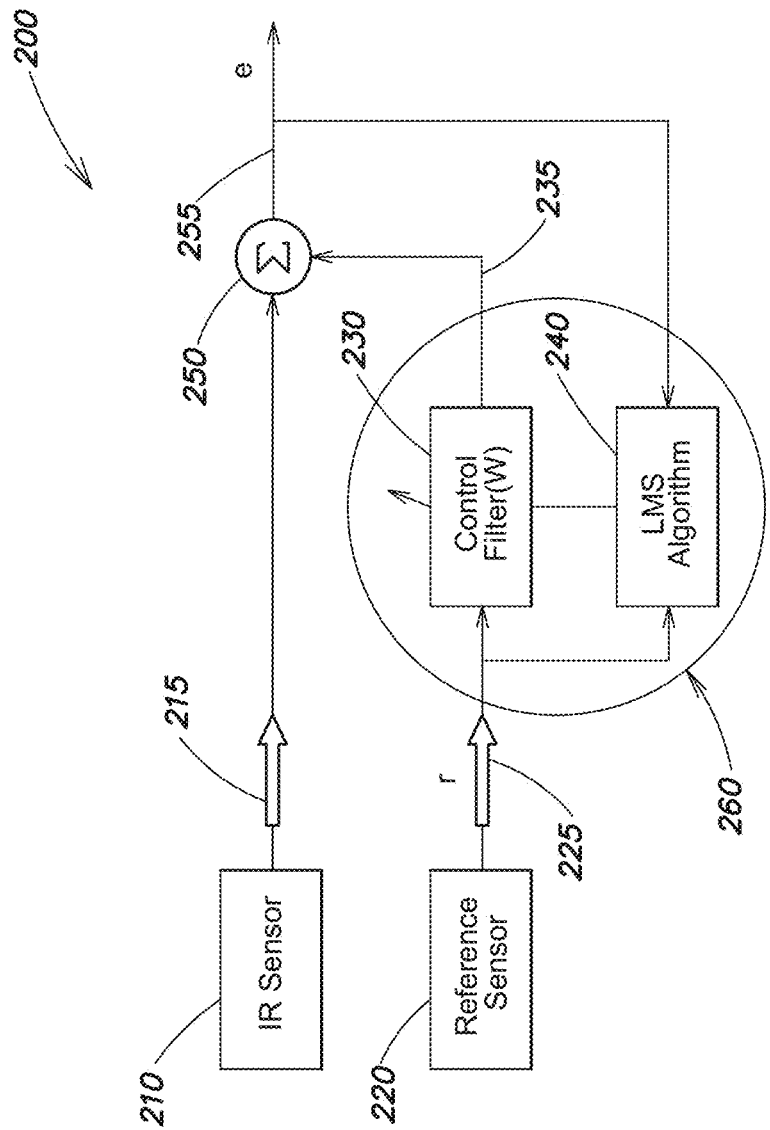
FIG. 2 is a block diagram of one example of an infrared sensing system according to aspects of the present invention.

Referring to FIG. 2 there is illustrated a schematic block diagram for an IR sensor system 200 incorporating adaptive processing for vibration cancelation according to certain embodiments. The IR sensor 210 provides an output signal 215 that is referred to as the "unprocessed" or "open-loop" IR sensor response signal. The system further includes a reference sensor 220, which can be an accelerometer, for example. The reference sensor 220 outputs a reference signal, (r), labeled 225 in FIG. 2. The reference sensor 220 can be disposed on the platform with and close to the IR sensor 210, such that the reference signal 225 is well correlated with the local acceleration response of the IR sensor 210. In one example, the reference sensor 220 can be coupled to a housing of the IR sensor 210.

The system 200 includes an adaptive controller comprised of a control filter 230 and an implementation of a least-mean-squares (LMS) algorithm module 240. The LMS algorithm module 240 may be implemented in hardware and/or software, according to well-known techniques in the art. As discussed above, the adaptive controller is applied to the local acceleration signal (as characterized by the reference signal, (r), from the reference sensor 220) to match the portion of the IR response signal 215 that is correlated with the reference sensor. The resulting signal (e), labeled 255 in FIG. 2, is obtained by subtracting the filter output 235 from the IR response signal 215 to provide a signal where the response to local vibration has been minimized. The signal 255 corresponds to the "processed" or "closed-loop" IR sensor response signal.

In particular, according to one embodiment, the reference signal 225 is supplied to the controller 260, as shown in FIG. 2. The IR response signal 215, and the output signal 235 from the control filter 230 are input to a summation/differencing block 250, the output of which is a "residual" signal (e), which is the difference between the two inputs. In one example, the control filter 230 is an adaptive digital finite impulse response (FIR) filter, and may be described by the following equation:

$$w(n+1)=w(n)+\mu*r(n)*e(n) \quad (1)$$

In Equation (1), w(n) is a vector of digital coefficients at time step n, representing the state of the control filter 230. Thus, the state of the control filter 230 for the next sample or time step, w(n+1), is based on the state of the filter from the current sample/time point, w(n), an adaptation constant, μ, the reference signal 225, identified as r(n) in Equation (1), and the residual signal, e(n). The LMS algorithm module 240 acts to adjust or adapt the control filter 230 so as to attempt to minimize the component of the residual signal, e, that is correlated with the reference signal 225. As a result, the coherence between these two signals is reduced, and preferably minimized. The adaptation constant, μ, controls the speed at which the filter coefficients converge during the adaptive process. Techniques to balance convergence speed and performance for algorithms corresponding to Equation (1) are well documented in the relevant literature and understood by those skilled in the art.

Thus, aspects and embodiments provide techniques for reducing the vibration sensitivity of an IR sensor. Certain embodiments include the use of one or more accelerometers or other reference sensor(s) 220 to provide a reference signal representative of local vibration excitations. Local adaptive processing is used to reduce or remove the vibration response from the IR sensor response signal 215, as discussed above. The local adaptive processing may advantageously involve the use of minimal processing power and memory (implementation of well-known FIR digital filters and LMS algorithms), and are easily compatible with sensor packaging to provide "smart" IR sensors (with built-in enhanced vibration cancelation).

Simulation Examples

The function and advantages of these and other embodiments will be more fully understood from the following examples. The examples are intended to be illustrative in nature and are not to be considered as limiting the scope of the systems and methods discussed herein.

Test and Simulation Set-Up

Figure 3:
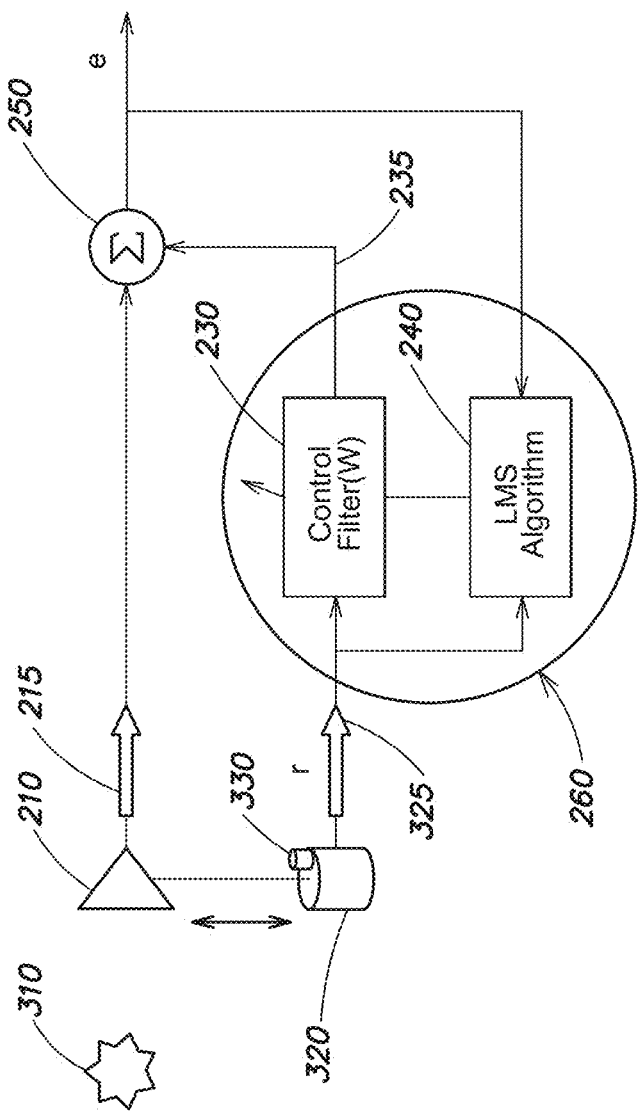
FIG. 3 is a block diagram of an experimental set-up used to simulate and test operation of an example of the sensing system of FIG. 2, according to aspects of the present invention.

Measurements and simulations were performed to demonstrate the use of a local acceleration response and adaptive processing to improve the vibration sensitivity of an IR sensor. An experiment was run to collect IR sensor data both with and without motion of the IR sensor 210. FIG. 3 is a block diagram illustrating the experimental set-up used for this experiment to validate the above-discussed approach for a system corresponding to that shown in FIG. 2. An IR emitter (source) 310 was strobed at ~80 Hz to provide a background IR signal. The IR sensor 210 was connected to a small shaker 320. The shaker output was set to ~100 Hz. An accelerometer 330 was mounted to the shaker 320 to measure the local vibration of the IR sensor 210 caused by the shaker 320. The output of the accelerometer was used as the reference signal 325 (r). IR sensor and accelerometer data were collected when the shaker was OFF and ON.

Figure 4:
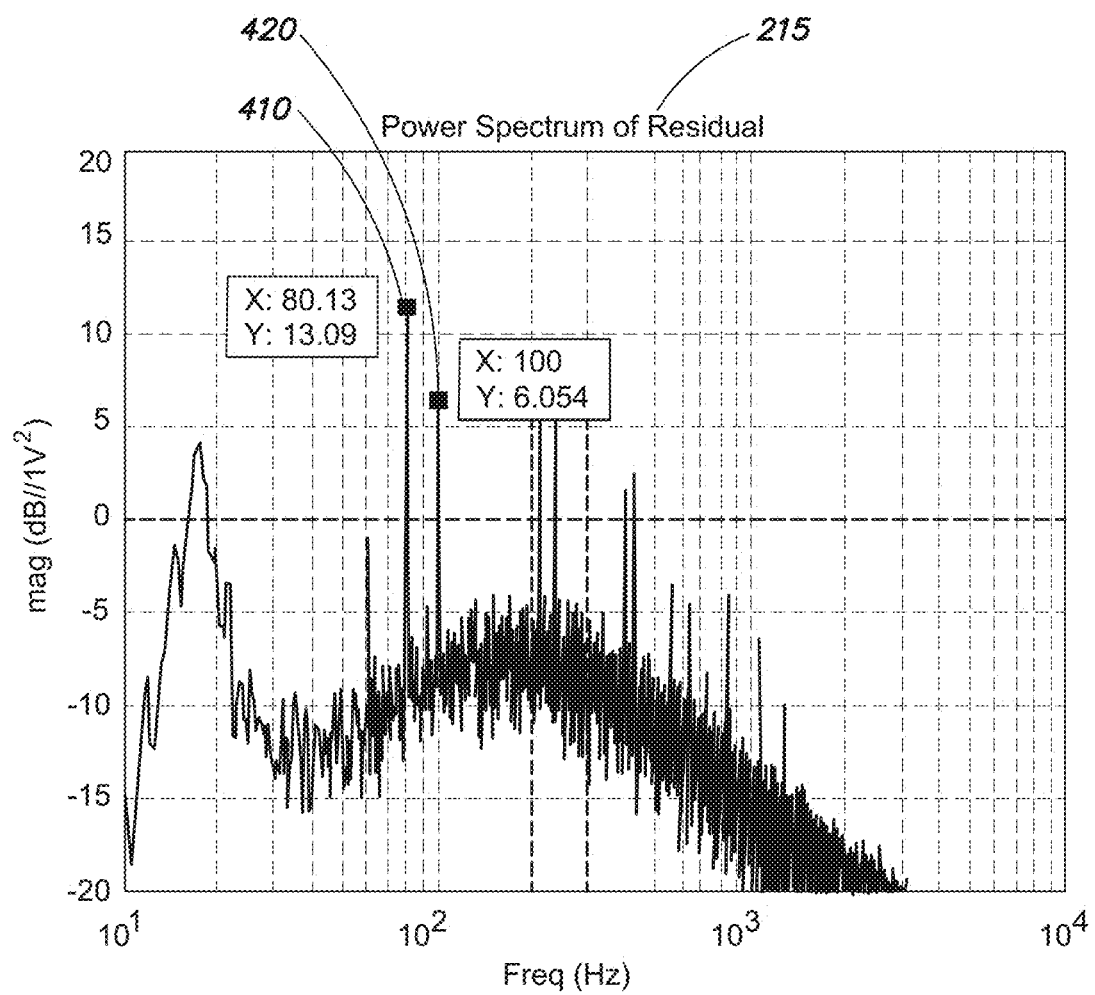
FIG. 4 is a graph showing the power spectrum of a measured IR sensor response including the response to local acceleration and simulated gunfire.

The spectrum of the IR sensor response 215 is shown in FIG. 4.

Figure 5A:
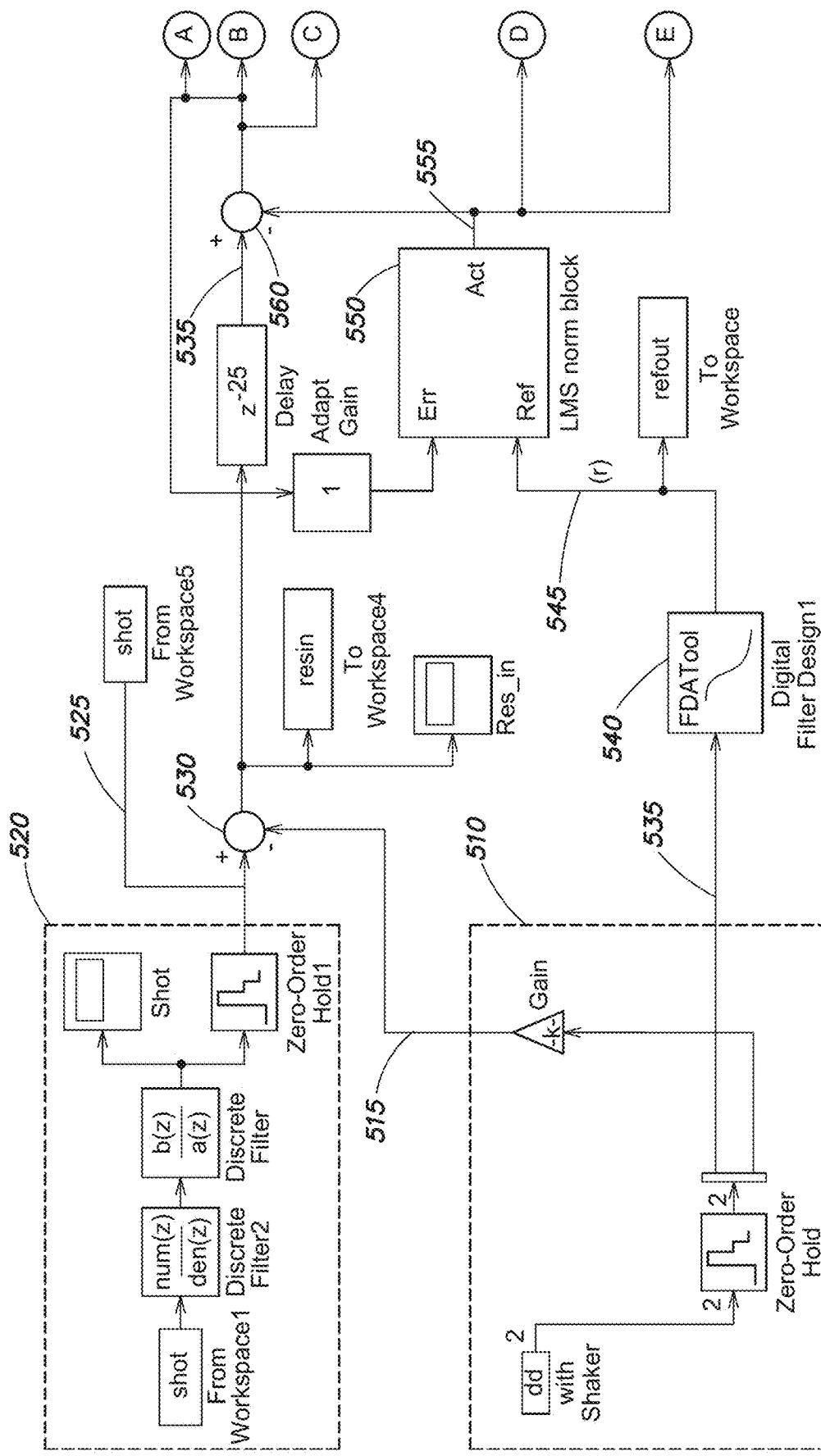
FIGS. 5A and 5B together are a diagram of a time-domain MATLAB Simulink model used to simulate the response of an example of the system of FIG. 2 to IR (muzzle flash) and vibration excitations, according to aspects of the present invention.
Figure 5B:
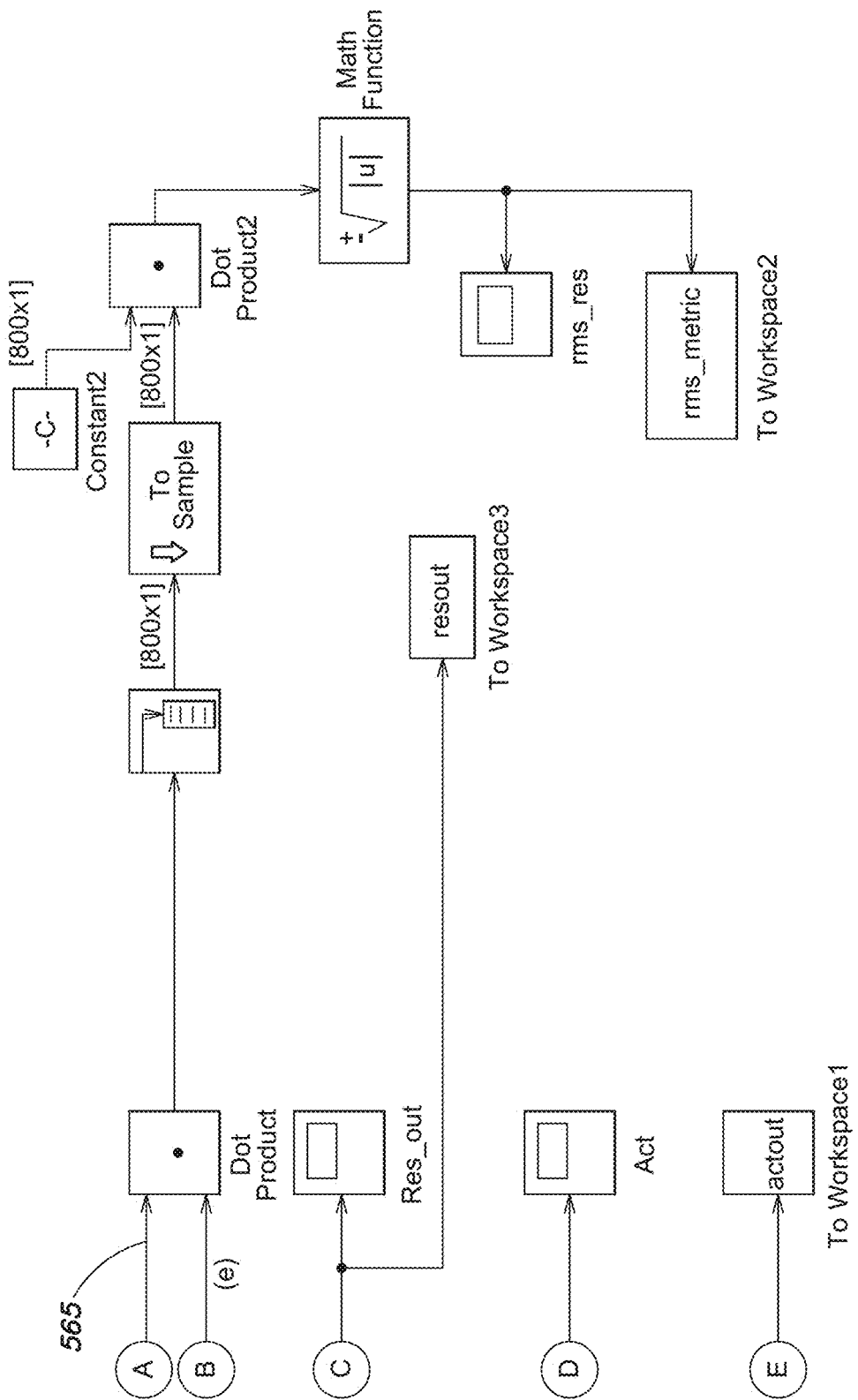

A digital simulation of the set-up of FIG. 3 was implemented in MATLAB Simulink™. The simulation model is illustrated in FIGS. 5A and 5B. Inputs to the model include the measured IR sensor and accelerometer data obtained as discussed above and represented by block 510. The IR sensor data 515 is augmented with simulated "flash" (also called shot) data 525, produced from simulation block 520, at the first summing junction 530. The resulting simulated IR sensor response 535 thus includes both vibration and IR event simulated responses. The simulated shot data 525 represents a short, transient IR event of interest, such as a muzzle flash from weapon discharge. The accelerometer data 535 is bandpass filtered (at 540) to focus the adaptive algorithm within the frequency region of interest. The output 545 of the bandpass filter 540 is a simulated reference signal (r) and is a first input to the adaptive control filter 550, as shown. Block 550, corresponding to the controller 260 in FIG. 3, includes the functionality of both the control filter 230 and the adaptive algorithm 240. The output 555 of the simulated adaptive filter 550 is subtracted from the IR sensor signal 535 at block 560, which is a simulation of the summation block 250 discussed above, to produce the "processed IR signal" 565 or simulated residual (e), which is a second input to the adaptive control filter 550. The remaining and additional blocks in the simulation model provide the ability to view the signals and processes occurring as the simulation is run in the simulation program, as will be understood and appreciated by those skilled in the art of mathematical simulations.

Referring again to FIG. 4, as shown, the spectrum of the IR sensor response 215 includes both the IR emitter response at ~80 Hz (point 410) and the response to local vibration at ~100 Hz (point 420). The broadband "hump" centered near 200 Hz is associated with the simulated flash/shot data 525 added in the simulation, as discussed above.

Simulation Results

Figure 6:
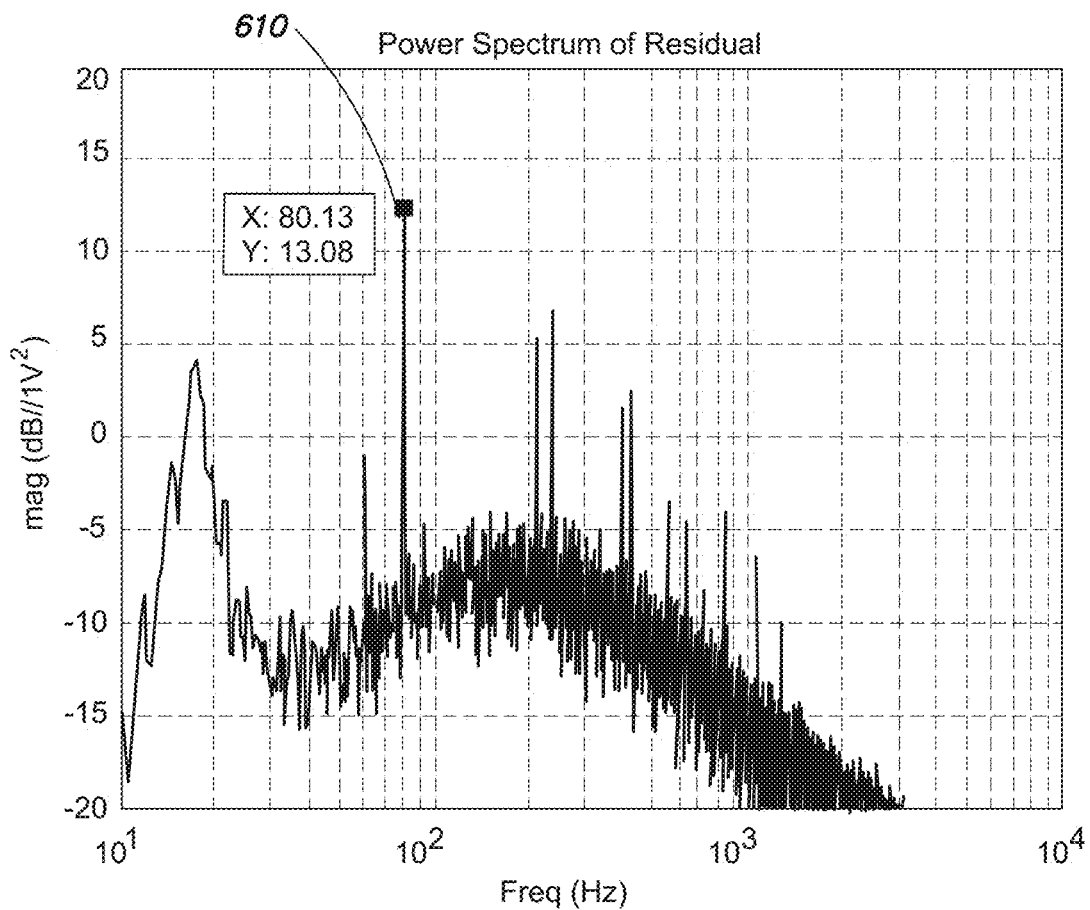
FIG. 6 is a graph showing the power spectrum of the IR sensor response of FIG. 4 processed to suppress the vibration-induced response using the techniques of FIGS. 3 and 5A-B, according to aspects of the present invention.

When the simulation is run, the output of the adaptive filter 550 converges to match the portion of the IR signal 535 that is correlated with the accelerometer output (i.e., the response at 100 Hz shown in FIG. 4). The response of the processed residual signal 565 (i.e., at the output of the summation 560 of the IR signal 535 and the output of the adaptive filter 555) is shown in FIG. 6. As desired, the response that was at 100 Hz (point 420) in the raw IR sensor signal, shown in FIG. 4, is removed. Additionally, and of equal importance, is that the simulated background IR signal 610 at approximately 80 Hz (corresponding to point 410 in FIG. 4) is well preserved, as is the simulated broadband shot response centered around 200 Hz.

Figure 7:
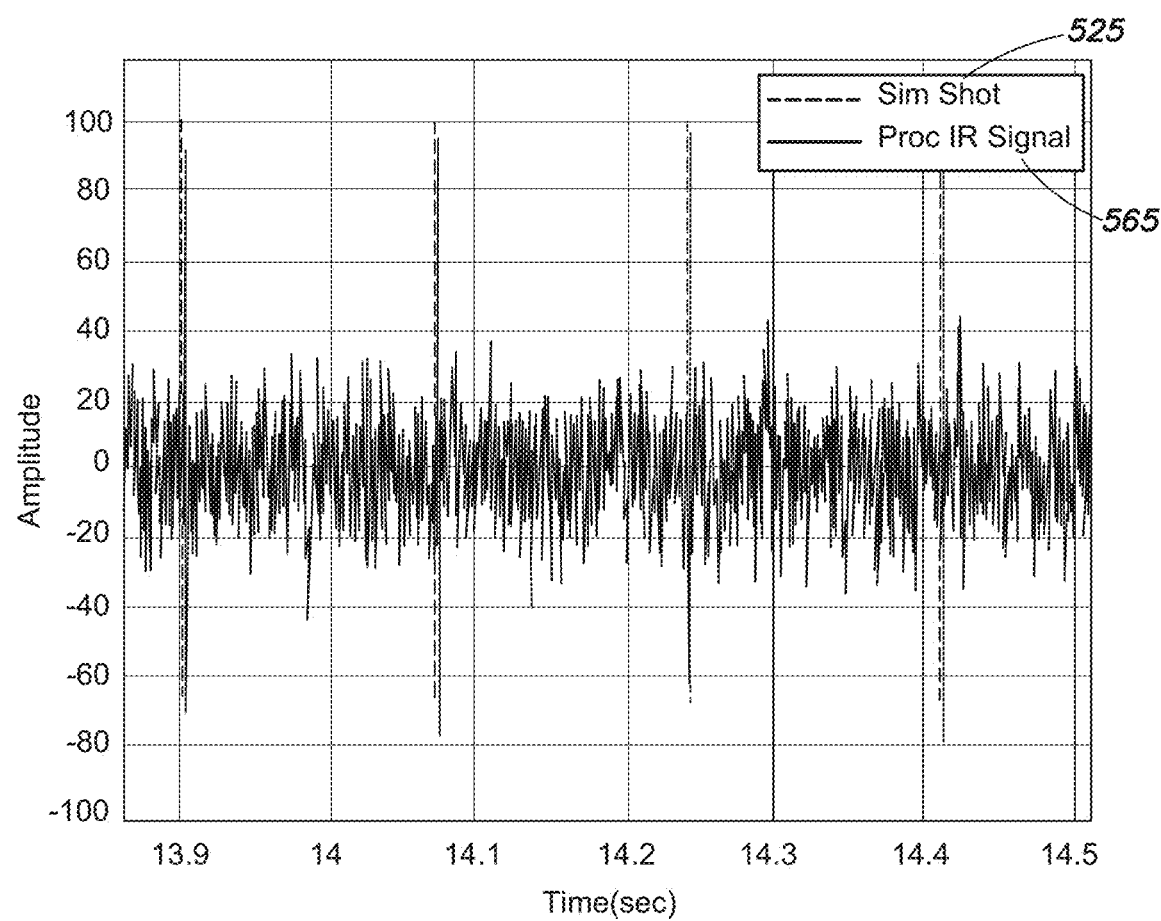
FIG. 7 is a graph comparing the simulated shot data with the processed IR signal from an example of the simulation model of FIGS. 5A-B, according to aspects of the present invention.

FIG. 7 compares a time series of the simulated shot data 525 with the processed IR signal 565. The agreement between the two is very close at the location of each of the 4 simulated shots shown, indicating that the adaptive algorithm, while minimizing the vibration response, does not significantly affect the desired flash signal. The small offset in time for this comparison corresponds to the delay block included in the simulation prior to 535 in FIGS. 5A-B.

The simulation results presented in FIGS. 6 and 7 illustrate the case when the vibration noise and background IR signals were both tonal. However, the adaptive filtering approach disclosed herein can also be used to remove broadband vibration noise. For example, as indicated by trace 130 in FIG. 1B, in at least some applications, the background motion-induced noise may realistically be more broadband than narrowband. Accordingly, data from the IR sensor and accelerometer were collected using the setup of FIG. 3 with two changes. First, the IR strobe was removed and the IR sensor was instead aimed in a fixed direction towards distant objects. Second, the shaker was excited with broadband noise, versus the tonal noise of the previous example. Using these data, the simulation was run again to illustrate system performance against broadband vibration excitation. These results are presented in FIGS. 8 through 11B.

Figure 8:
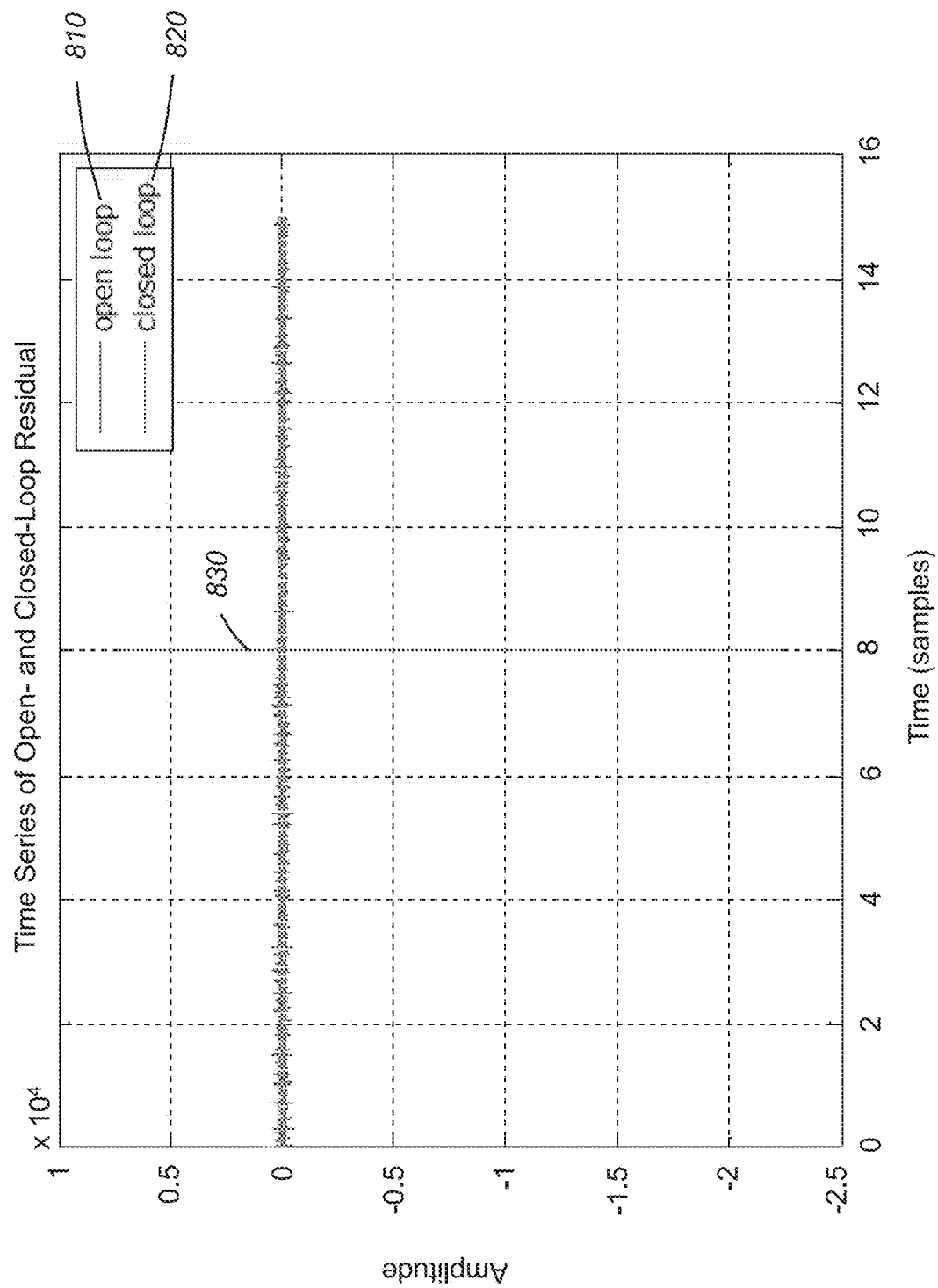
FIG. 8 is a graph showing simulated open-loop (without adaptive filtering) and closed-loop (with adaptive filtering) IR sensor output signals obtained by running another example of the simulation model of FIGS. 5A-B.

FIG. 8 illustrates the simulated residual signal 565 as a time series for the open-loop case (adaptive filter 550 turned off), as represented by trace 810, and closed-loop case (with adaptive filtering applied according to the approach discussed above), as represented by trace 820. The simulated shot data 525 included a shot 830 at the 8 second time point.

Figure 9A:
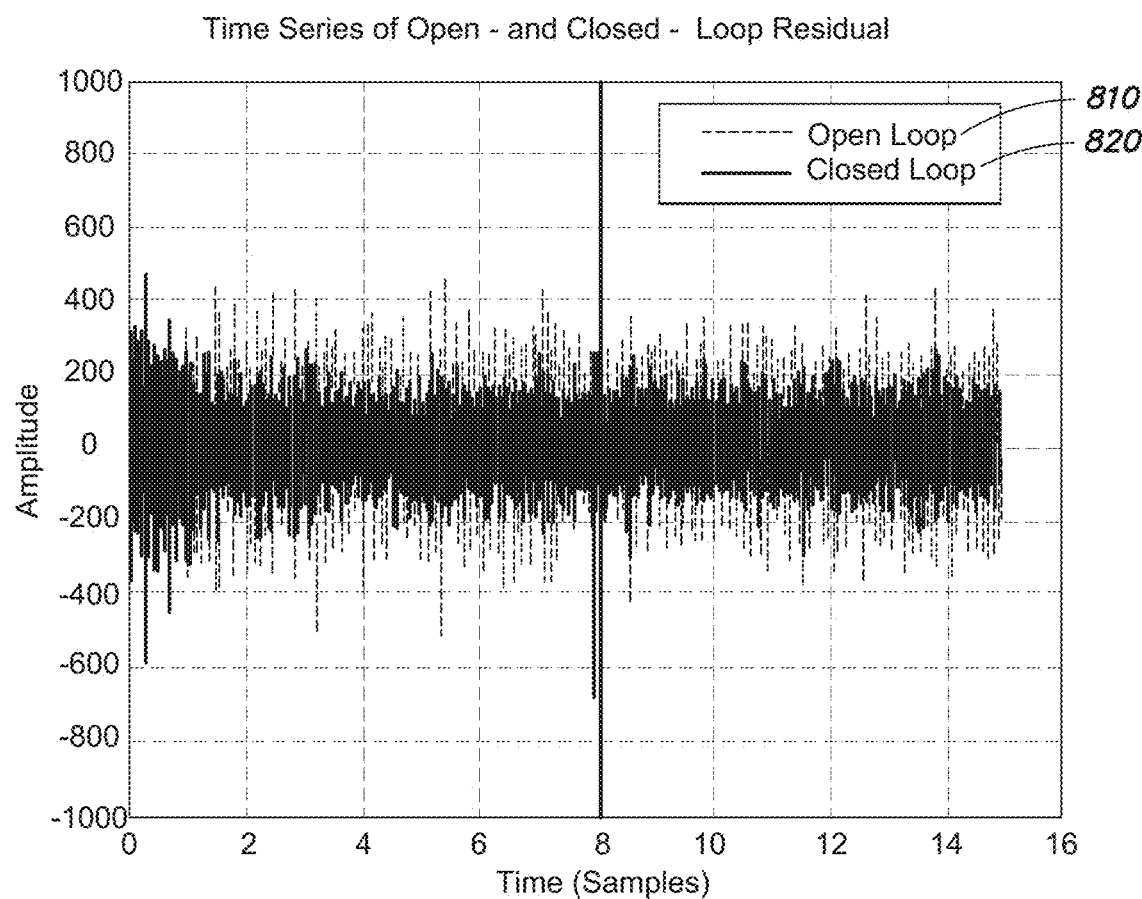
FIG. 9A is an expanded view in amplitude of a portion of FIG. 8.

FIG. 9A illustrates an expanded view of a portion of the responses shown in FIG. 8, showing an expanded view of the vibration-induced noise. As shown, there is a reduction in the amplitude of the noise in the processed IR signal 565 (closed-loop residual).

Figure 9B:
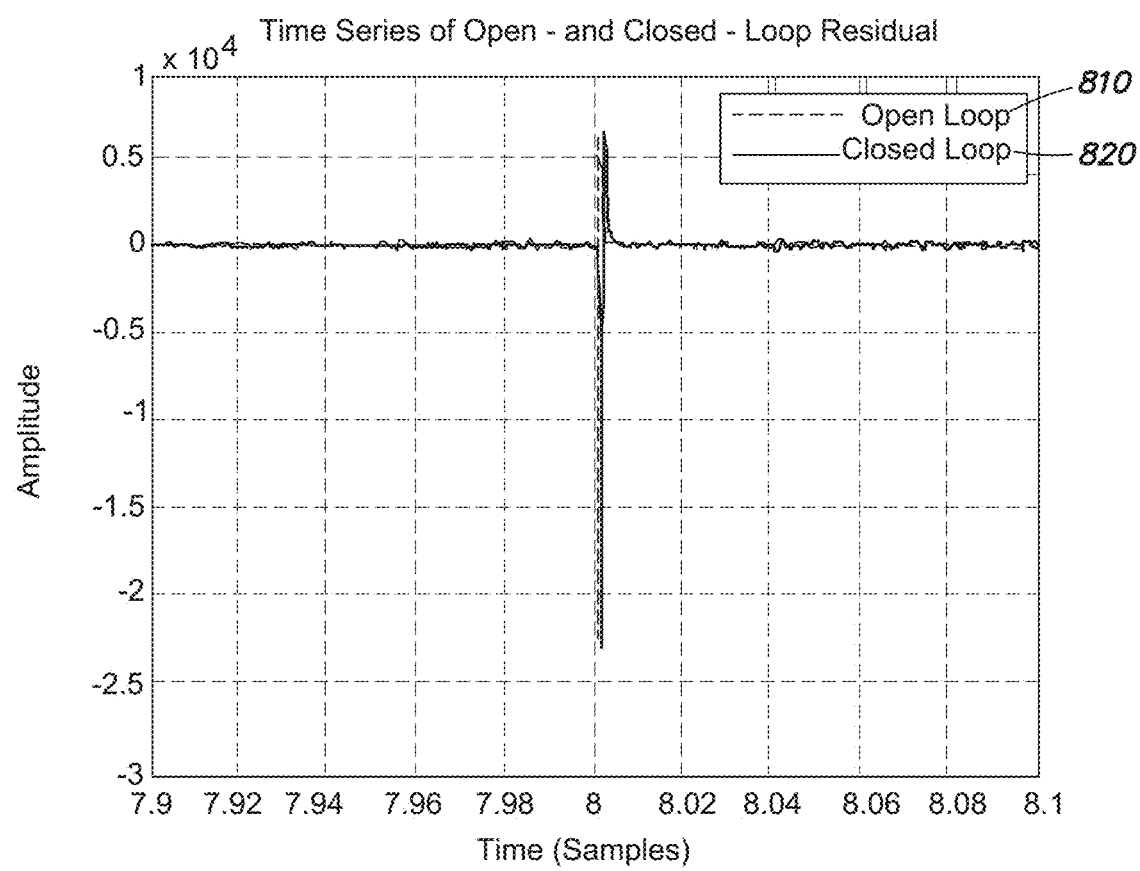
FIG. 9B is an expanded view in time of a portion of FIG. 8.

FIG. 9B shows as expanded view of a portion of the responses of FIG. 8 around the time of the simulated shot. As shown, the shot signature is well preserved in the processed IR signal 565 (closed-loop residual).

Figure 10:
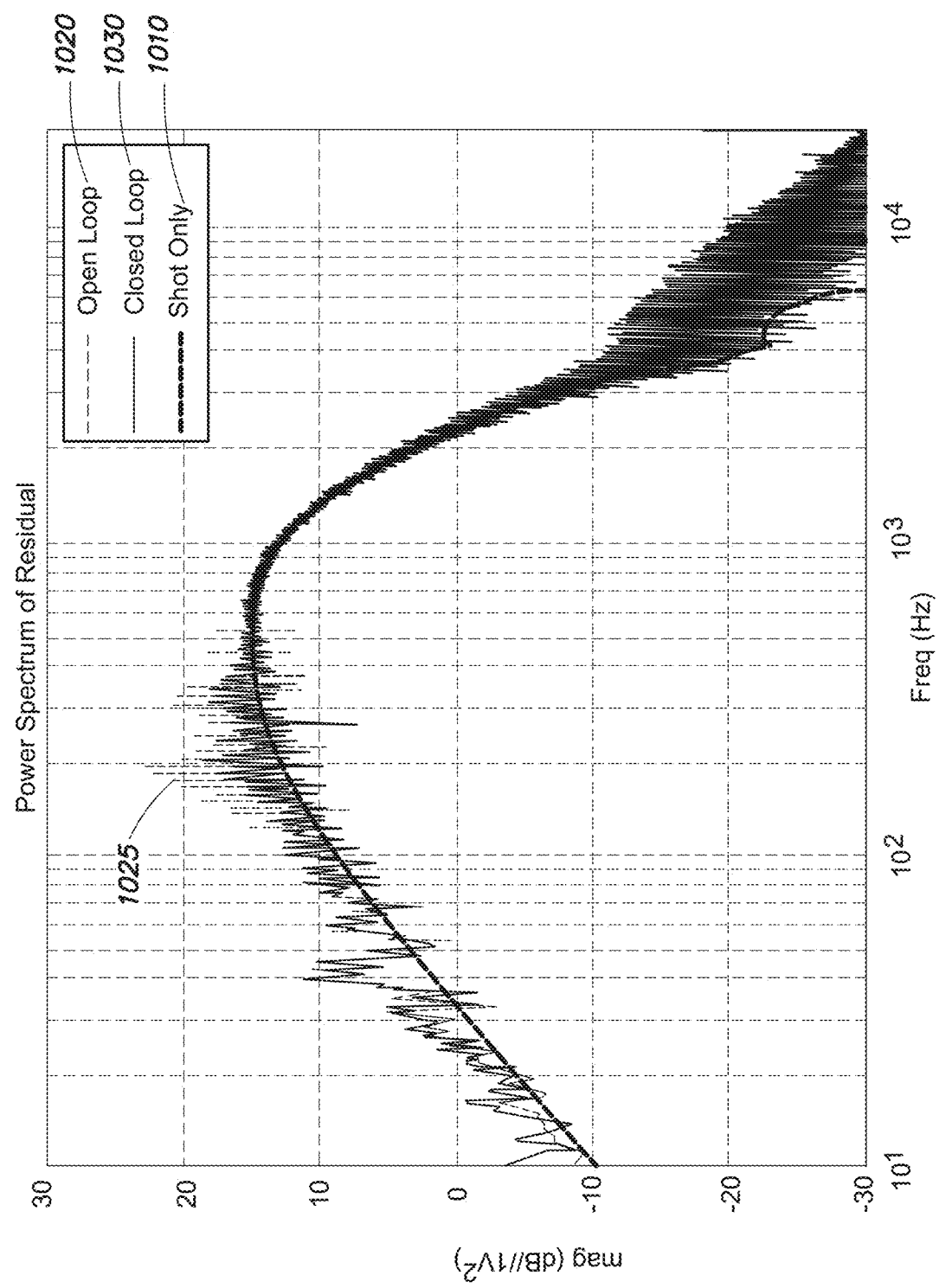
FIG. 10 is a graph showing the simulated open-loop (without adaptive filtering) and closed-loop (with adaptive filtering) power spectrum of the IR sensor response and the applied shot data of FIG. 8, according to aspects of the present invention.

FIG. 10 shows the power spectrum of the simulated shot data 525 (represented by trace 1010), along with the simulated IR sensor response without adaptive processing (trace 1020) and with adaptive processing (trace 1030). As shown, the adaptive processing significantly reduces the vibration-induced response in the frequency range between 100 Hz and 300 Hz (visible as peak 1025 in trace 1020 representing the unprocessed response), as desired.

Figure 11A:
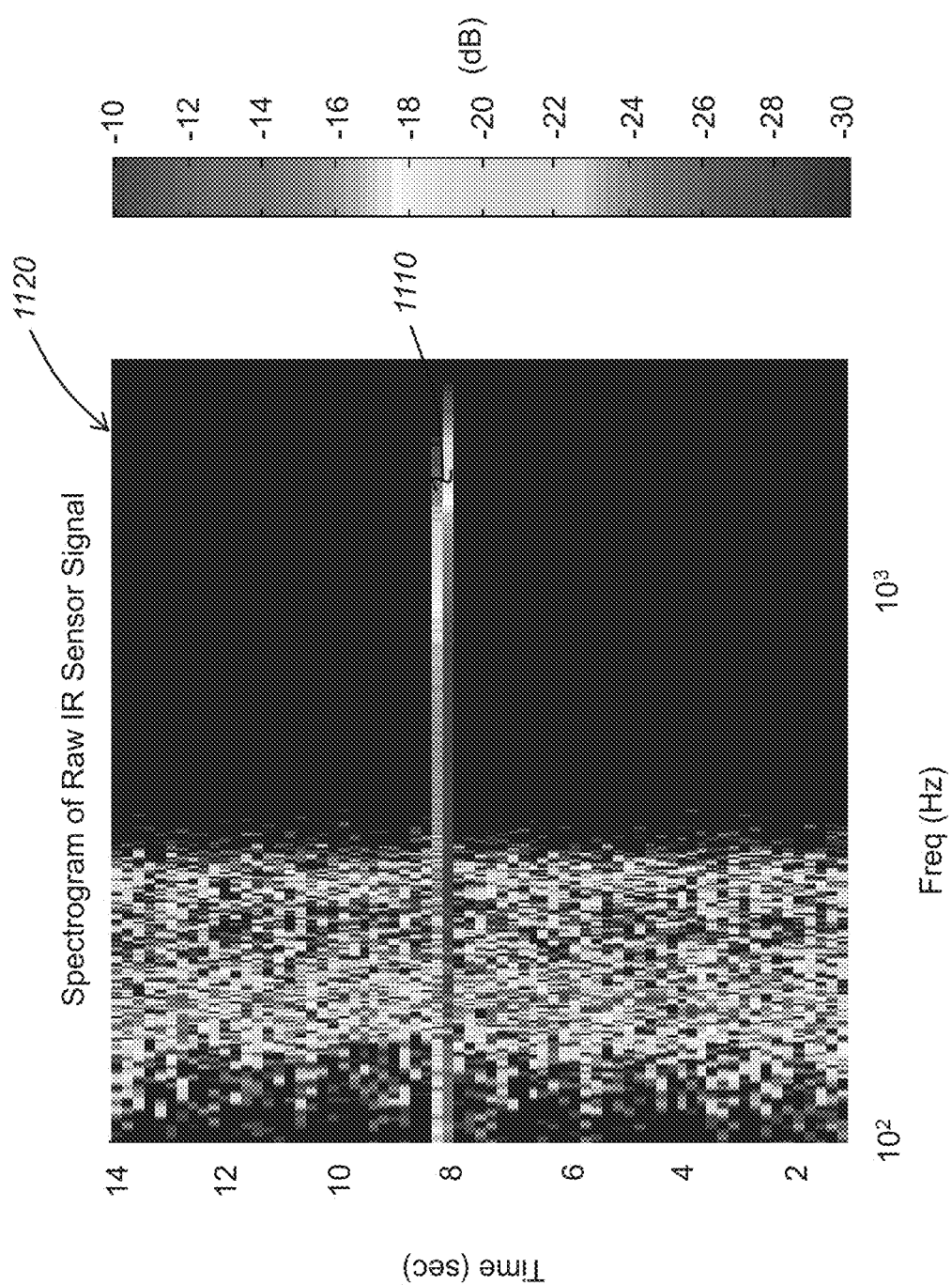
FIG. 11A is a spectrogram of the simulated open-loop (without adaptive filtering) signal throughout a simulated shot event.
Figure 11B:
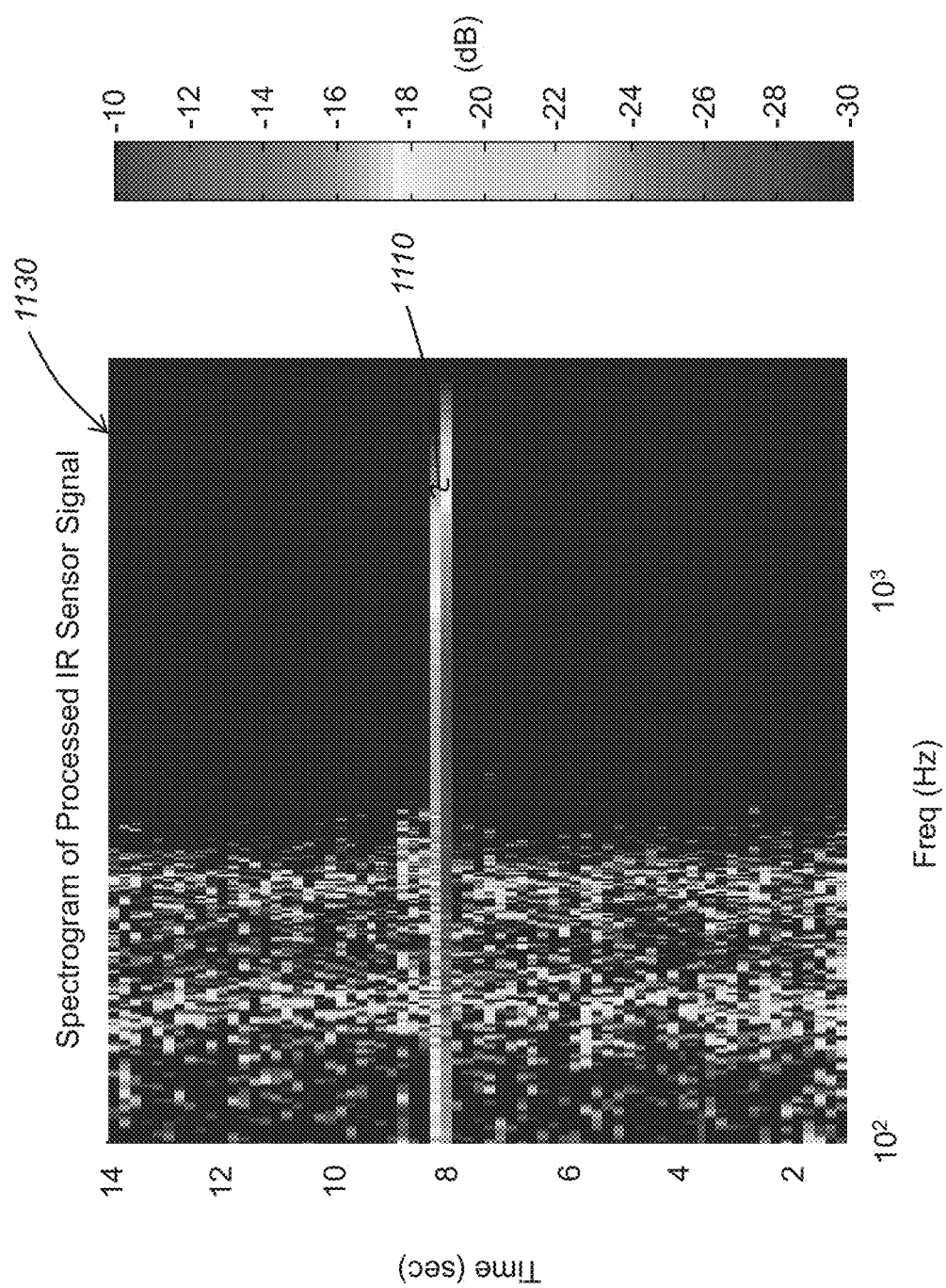
FIG. 11B is a spectrogram of the simulated closed-loop (with adaptive filtering) signal throughout a simulated shot event.

FIGS. 11A and 11B display spectrograms of the raw (FIG. 11A) and processed (FIG. 11B) residual signals 1120 and 1130, respectively. A comparison of these figures reveals that the adaptive filter effectively reduces the vibration-induced noise in the processed residual signal 1130 throughout the simulation, while passing the simulated shot signature, identified by 1110, with good fidelity.

Thus, the above measurement-based simulations demonstrate the effectiveness of using adaptive filter control to minimize the vibration response of an IR sensor, while preserving the response to the IR excitation of interest (e.g., a gun-shot signature). The simulations showed that using adaptive processing successfully reduced the IR sensor response to the vibration excitation, as desired, and thereby may provide improved signal-to-noise ratio for improved detection range or confidence. The techniques discussed herein may be extended to use multiple reference signals, and/or other adaptive algorithms, as will be appreciated by those skilled in the art, which may be advantageous in certain applications.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An infrared (IR) sensing system for vehicle-based counter-shooter applications comprising:
   an IR sensor configured to produce an IR sensor output signal representative of a response of the IR sensor to an IR signature of a muzzle flash of a gunshot event and a local vehicle motion-induced vibration excitation that substantially overlaps in frequency with the IR signature of the muzzle flash of the gunshot event;
   a reference sensor coupled to a housing of the IR sensor and configured to provide a reference signal responsive to the local vehicle motion-induced vibration excitation; and
   a controller, including an adaptive digital filter, coupled to the IR sensor and to the reference sensor, and configured to receive the reference signal and to adjust coefficients of the adaptive digital filter so as to minimize coherence between a residual signal and the reference signal to remove the local vehicle motion-induced vibration excitation from the IR sensor output signal, and thereby preserve the IR signature of the muzzle flash of the gunshot event, the residual signal being a difference between the IR sensor output signal and a filter output signal from the adaptive digital filter.

2. The IR sensing system of claim 1 wherein the reference sensor is an accelerometer and the reference signal is an acceleration signal.

3. The IR sensing system of claim 2 wherein the IR sensor and the accelerometer are disposed proximate one another on a movable platform.

4. The IR sensing system of claim 2 wherein the controller is configured to implement a least-mean-square algorithm to minimize a portion of the IR sensor output signal that is correlated with the acceleration signal, thereby minimizing the coherence.

5. The IR sensing system of claim 4 wherein the controller is further configured to receive the residual signal.

6. The IR sensing system of claim 1 wherein the controller is configured to receive the residual signal and to implement a least-mean-square algorithm to minimize a portion of the IR sensor output signal that is correlated with the reference signal, thereby minimizing the coherence.

7. An infrared (IR) sensing system for vehicle-based counter-shooter applications comprising:
    an IR sensor configured to produce an IR sensor output signal representative of a response of the IR sensor to an IR signature of a muzzle flash of a gunshot event and a local vehicle motion-induced vibration excitation that substantially overlaps in frequency with the IR signature of the muzzle flash of the gunshot event;
    at least one accelerometer coupled to a housing of the IR sensor and configured to provide an acceleration signal responsive to the local vehicle motion-induced vibration excitation; and
    a controller, including an adaptive digital filter, coupled to the IR sensor and to the at least one accelerometer, and configured to receive the acceleration signal and to adjust coefficients of the adaptive digital filter so as to minimize coherence between a residual signal and the acceleration signal to remove the local vehicle motion-induced vibration excitation from the IR sensor output signal, and thereby preserve the IR signature of the muzzle flash of the gunshot event, the residual signal being a difference between the IR sensor output signal and a filter output signal from the adaptive digital filter.

8. The IR sensing system of claim 7 wherein the controller is configured to implement a least-mean-square algorithm to minimize a portion of the IR sensor output signal that is correlated with the acceleration signal, thereby minimizing the coherence.

9. The IR sensing system of claim 7 wherein the controller is further configured to receive the residual signal.

10. A method of providing vibration cancelation in an infrared (IR) sensing system for vehicle-based counter-shooter applications, the method comprising:
    receiving an IR sensor output signal from an IR sensor, the IR sensor output signal being representative of a response of the IR sensor to an IR signature of a muzzle flash of a gunshot event and a local vehicle motion-induced vibration excitation that substantially overlaps in frequency with the IR signature of the muzzle flash of the gunshot event;
    receiving at an input to an adaptive digital filter a reference signal from a reference sensor, the reference signal being responsive to the local vehicle motion-induced vibration excitation;
    producing a residual signal by taking a difference between the IR sensor output signal and a filter output signal from the adaptive digital filter; and
    adjusting coefficients of the adaptive digital filter so as to minimize coherence between the residual signal and the reference signal to remove the local vehicle motion-induced vibration excitation from the IR sensor output signal, and thereby preserve the IR signature of the muzzle flash of the gunshot event.

11. The method of claim 10 wherein the reference sensor is an accelerometer and the reference signal is an acceleration signal.

12. The method of claim 11 wherein adjusting the coefficients includes applying a least-mean-square algorithm to minimize a portion of the IR sensor output signal that is correlated with the acceleration signal, thereby minimizing the coherence between the residual signal and the acceleration signal.

* * * * *